United States Patent
Chan et al.

(10) Patent No.: US 6,943,963 B2
(45) Date of Patent: Sep. 13, 2005

(54) COLLAPSIBLE LENS BARREL

(75) Inventors: Raymond Chan, Kowloon (CN); Yiu Hung Li, Kowloon (CN); Nobuaki Higashi, Shibuya-ku (JP); Mikihiko Kato, Minato-ku (JP)

(73) Assignees: IDT Data System Limited, Hong Kong (CN); Fuji Film Axia Co., Ltd., Tokyo (JP); Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/829,297

(22) Filed: Apr. 22, 2004

(65) Prior Publication Data

US 2004/0263999 A1 Dec. 30, 2004

(30) Foreign Application Priority Data

Apr. 24, 2003 (JP) ........................... 2003-120028

(51) Int. Cl.[7] ................. G02B 15/14; G03B 19/02
(52) U.S. Cl. ................... 359/694; 359/699; 359/700; 396/349
(58) Field of Search .................. 359/694, 699–701, 359/703, 823; 396/349; 348/373–376

(56) References Cited

U.S. PATENT DOCUMENTS

| | | | |
|---|---|---|---|
| 4,439,018 A | * | 3/1984 | Okajima et al. ............. 359/705 |
| 4,848,884 A | * | 7/1989 | Enomoto ..................... 359/696 |
| 6,256,063 B1 | | 7/2001 | Saito et al. .................. 348/231 |
| 6,525,767 B2 | | 2/2003 | Saito et al. ............. 348/231.7 |
| 6,856,763 B2 | * | 2/2005 | Allen et al. .................... 396/72 |
| 2004/0240874 A1 | * | 12/2004 | DiRisio ....................... 396/349 |

FOREIGN PATENT DOCUMENTS

JP           10-248029 A          9/1998

* cited by examiner

Primary Examiner—Georgia Epps
Assistant Examiner—M. Hasam
(74) Attorney, Agent, or Firm—Birch, Stewart, Kolasch & Birch, LLP (57) ABSTRACT

When a wheel is rotated, first inclined portions of end surface cams provided on the wheel push corresponding cam followers formed on a movable cylinder. Accordingly, the movable cylinder holding a photographing lens is extended. Then, when each of the cam followers reaches a first flat portion of the corresponding end surface cam, the movable cylinder is placed in a photographing position. In the photographing position, when the wheel is further rotated, the cam follower is pushed by a second inclined portion of the end surface cam. The movable cylinder is thus extended. Then, when the cam follower reaches a second flat portion of the corresponding end surface cam, the movable cylinder is placed in a macro photographing position.

18 Claims, 10 Drawing Sheets

COLLAPSIBLE LENS BARREL

This Nonprovisional application claims priority under 35 U.S.C. §119(a) on Patent Application No(s). 2003-120028 filed in JAPAN on Apr. 24, 2003, the entire contents of which are hereby incorporated by reference.

BACKGROUND OF THE INVENTION

1. Field of the Invention

The present invention relates to a collapsible lens barrel, and in particular, to a collapsible lens barrel for use in a card type digital camera.

2. Description of the Related Art

Digital cameras of a business card size called card type digital cameras preferably have no irregularities on their surfaces and are as thin as possible.

However, a photographing lens and a photographing element require a specified optical path length. Consequently, a decrease in thickness is limited.

Thus, in the card type digital camera described in Japanese Patent Application Publication No. 10-248029, a lens portion holding the photographing lens is adapted to extend from and collapse into a camera main body via a spring. Accordingly, before photographing, the lens portion is popped up from the camera main body to provide an optical path length for the photographing lens and element.

However, with the method of popping up the lens portion to extend the photographing lens, it is impossible to precisely extend the photographing lens to a predetermined photographing position. Consequently, an image formed position may deviate from the correct one. This disadvantageously prevents sharp images from being obtained. In particular, in recent years, card type digital cameras of this kind have a large number of pixels. Thus, the deviation of the image formed position may markedly affect image quality.

SUMMARY OF THE INVENTION

The present invention is provided in view of these circumstances. It is an object of the present invention to provide a collapsible lens barrel that can precisely extend a photographing lens to predetermined position using a simple configuration.

To accomplish this object, the present invention provides a collapsible lens barrel comprising a fixed cylinder fixed to a camera main body, a wheel rotatively movably provided around an outer periphery of a proximal end portion of the fixed cylinder, a plurality of end surface cams disposed on an inner peripheral portion of the wheel at predetermined intervals, a movable cylinder which holds a photographing lens, which is guided so as to be movable in a direction of an optical axis with respect to the fixed cylinder, and which has a plurality of cam followers abutting the plurality of end surface cams, and an urging device which urges the cam followers of the movable cylinder to the end surface cams, wherein the wheel is rotated to extend the movable cylinder from a collapsed position to a photographing position.

According to the present invention, when the wheel is rotated, the movable cylinder is extended from the collapsed position to the photographing position through the action of the end surface cams, formed on the wheel, and of the cam followers, formed on the movable cylinder. By thus moving the movable cylinder holding the photographing lens using the action of the end surface cams and cam followers, it is possible to move the movable cylinder precisely to a predetermined position using the simple configuration.

In the present invention, each of the end surface cams further comprises a first inclined portion inclined from the optical axis through a predetermined angle, a first flat portion formed contiguously to the first inclined portion so as to extend orthogonally to the optical axis, a second inclined portion formed contiguously to the first flat portion and inclined from the optical axis through a predetermined angle, and a second flat portion formed contiguously to the second inclined portion so as to extend orthogonally to the optical axis. When the wheel is rotated, the movable cylinder may be extended from the collapsed position to a first photographing position through action of the first inclined portion and first flat portion. When the wheel is further rotated, the movable cylinder is extended from the first photographing position to a second photographing position through action of the second inclined portion and second flat portion.

According to this aspect, when the wheel is rotated, the first inclined portion of each end surface cam pushes the corresponding cam follower, provided in the movable cylinder. As a result, the movable cylinder holding the photographing lens is extended along the optical axis. Then, once the cam follower reaches the first flat portion of the end surface cam, the extension is paused to locate the movable cylinder in the first photographing position. In the first photographing position, when the wheel is further rotated, the second inclined portion of the end surface cam pushes the corresponding cam follower. Then, the movable cylinder is extended along the optical axis again. Then, once the cam follower reaches the second flat portion of the end surface cam, the extension is stopped to locate the movable cylinder in the second photographing position. This enables the movable cylinder holding the photographing lens to be extended to the two positions, the first and second photographing positions.

Furthermore, in the present invention, each of the end surface cams may further comprise a first projecting portion formed in a junction between the first inclined portion and the first flat portion so as to project from the first flat portion and a second projecting portion formed in a junction between the second inclined portion and the second flat portion so as to project from the second flat portion.

According to this aspect, the projecting portion projecting from the first flat portion is formed in the junction between the first inclined portion and the first flat portion. The projecting portion projecting from the second flat portion is formed in the junction between the second inclined portion and the second flat portion. This provides a clear point at which the first inclined portion switches to the first flat portion and a clear point at which the second inclined portion switches to the second flat portion. It can be clearly determined that the movable cylinder is located in the first or second photographing position. That is, the thus formation of the projecting portions allows the finger rotating the wheel to feel a click when the cam follower passes over the projecting portion. The user can thus clearly determine that the movable cylinder has been placed in the first or second photographing position. Furthermore, it is possible to effectively prevent the wheel from being inadvertently rotated.

Moreover, in the present invention, the movable cylinder may further comprise an internal cylinder having the photographing lens held on its inner peripheral portion, an external cylinder which is connected to the internal cylinder at their leading end portions and which has the cam followers formed on an inner peripheral portion of the external cylinder. The internal cylinder is fitted into an inner peripheral portion of the fixed cylinder. Linearly advanced guide portions formed on an outer peripheral surface of the internal cylinder are fitted onto or into convex or concave linearly advancing guide portions formed on the inner peripheral surface of the fixed cylinder along the optical axis. Accordingly, the movable cylinder is guided so as to be movable in the direction of the optical axis with respect to the fixed cylinder.

According to this aspect, the movable cylinder is composed of the internal and external cylinders. The photographing lens is held in the inner peripheral portion of the internal cylinder. The cam followers are formed on the inner peripheral portion of the external cylinder. The internal cylinder is fitted into the inner peripheral portion of the fixed cylinder. The linearly advanced guide portions, formed the outer peripheral surface of the internal cylinder, is fitted onto or into the linearly advancing guide portions, formed on the inner peripheral surface of the fixed cylinder. Accordingly, the movable cylinder is guided so as to be movable in the direction of the optical axis with respect to the fixed cylinder.

Furthermore, in the present invention, the cam followers may come into point contact with the corresponding end surface cams.

According to this aspect, each cam follower comes into point contact with the corresponding end surface cam to reduce frictional resistance. It is thus possible to smoothly extend the movable cylinder holding the photographing lens.

Moreover, in the present invention, the movable cylinder may be formed of a plastic material in a dark color.

According to this aspect, the movable cylinder is formed of a plastic material in a dark color (for example, black). This improves a shielding effect to effectively prevent unwanted light from entering the barrel.

As described above, according to the present invention, when the wheel is rotated, the movable cylinder is extended from the collapsed position to the photographing position through the action of the end surface cams, formed on the wheel, and of the cam followers, formed on the movable cylinder. By thus moving the movable cylinder holding the photographing lens using the action of the end surface cams and cam followers, it is possible to move the movable cylinder precisely to the predetermined position using the simple configuration.

DETAILED DESCRIPTION OF THE PREFERRED EMBODIMENTS

With reference to the drawings, a detailed description will be given of a preferred embodiment of a collapsible lens barrel according to the present invention.

Figure 1:
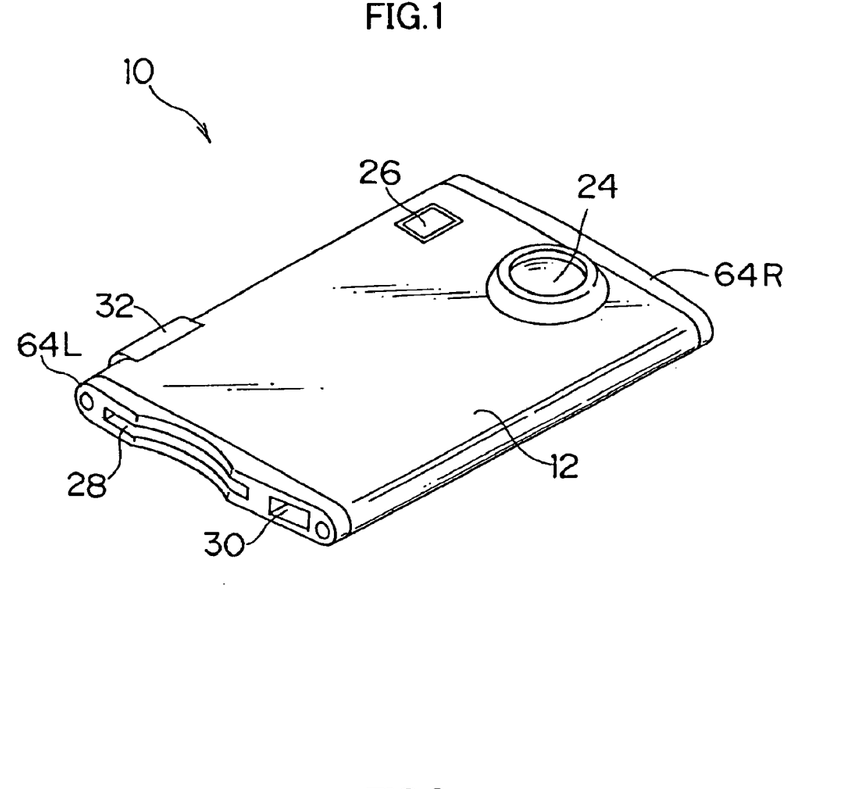
FIG. 1 is a front perspective view of a digital camera into which a collapsible lens barrel according to the present invention is incorporated.
Figure 2:
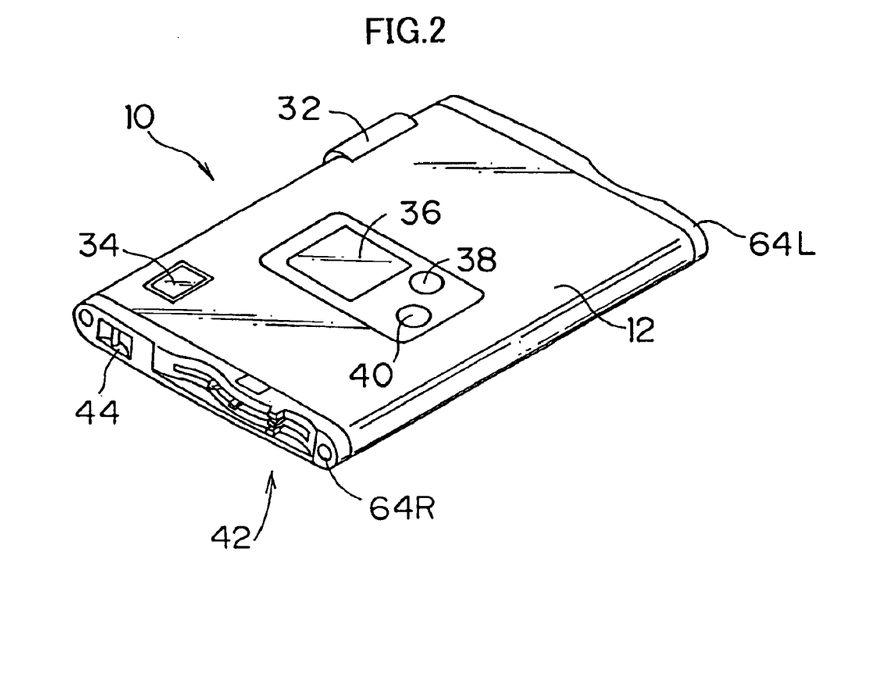
FIG. 2 is rear perspective view of the digital camera into which the collapsible lens barrel according to the present invention is incorporated.

FIGS. 1 and 2 are a front and rear perspective views of a digital camera into which a collapsible lens barrel according to the present invention is incorporated.

As shown in these figures, a digital camera 10 is of a card type having only a photographing function. A camera main body 12 is dimensioned like a business card and has a thickness of about 8 mm.

Figure 3A:
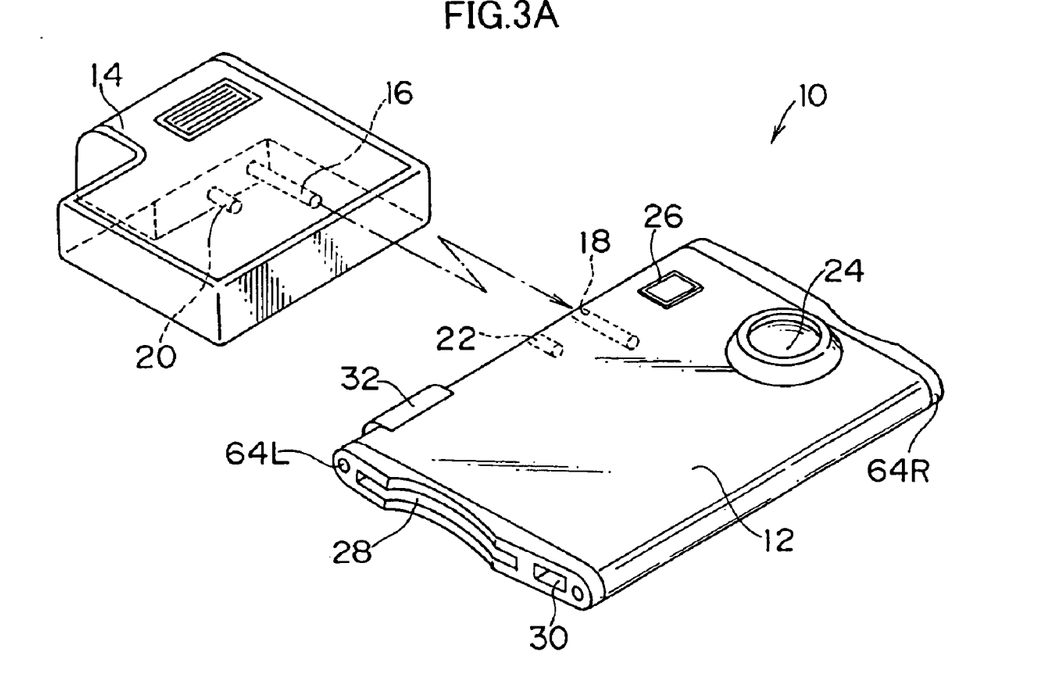
FIGS. 3A and 3B are front perspective view showing how a strobe is installed in a camera main body.
Figure 3B:
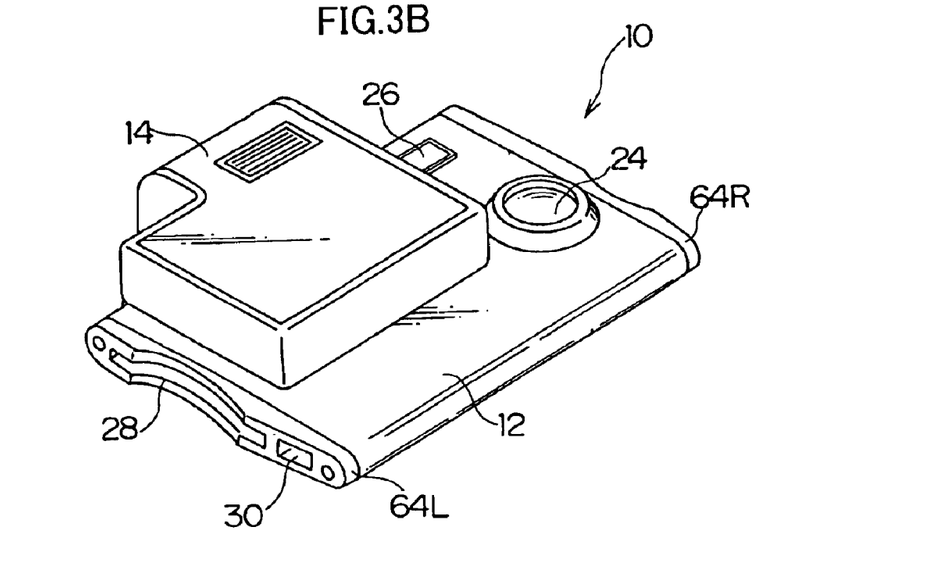

An external strobe 14 can be installed on a camera main body 12 as shown in FIGS. 3A and 3B. The external strobe 14 is fixed to the camera main body 12 by inserting its plug 16 into a jack 18 formed in a top surface of the camera main body 12 and screwing a strobe fixing screw 20 into a threaded hole 22 formed in the top surface of the camera main body 12.

A photographing lens 24 and a finder window 26 are provided on a front surface of the camera main body 12 as shown in FIG. 1.

The photographing lens 24 is composed of a collapsible single-focus lens. The photographing lens 24 is extended from a "collapsed position" through a "photographing position" to a "macro photographing position" in unison with a rotating operation of a wheel 54 constituting a power switch 42, described later.

A finder is composed of a reverse Galileo finder consisting of an objective that is a concave lens and an ocular that is a convex lens. The objective is located under a finder window 26.

A card slot 28 and a USB terminal 30 are provided on a left side (in the left of FIG. 1) of the camera main body 12.

A memory card is removably installed in the card slot 28. A photographed image is recorded in a memory card installed in the card slot 28. The digital camera 10 also has a built-in memory. If no memory card is installed in the card slot 18, images are recorded in the built-in memory.

A USB cable is connected to the USB terminal 30 so that image data recorded in the memory card or built-in memory can be loaded into a personal computer or the like via the USB cable.

As shown in FIGS. 1 and 2, a release button 32 is provided on the top surface of the camera main body 12. Pushing the release button 32 allows an image to be recorded in the built-in memory or memory card.

As shown in FIG. 2, a finder ocular portion 34, a liquid crystal display portion 36, an image quality switch/image deletion button 38, and a beep ON/OFF button 40 are provided on a rear surface of the camera main body 12.

The ocular, constituting the finder, is located in the finder ocular portion 34. The liquid crystal portion 36 is composed of monochromatic character liquid crystal to display the remaining number of photographs that can be taken, photographing image quality, the quantity of charges in batteries, the presence or absence of a beep, and the like. The image quality switch/image deletion button 38 functions to instruct on the switching of photographing image quality and the deletion of a photographed image. The beep ON/OFF button 40 functions to instruct a beep to be turned on or off.

A power switch 42 also used as a mode dial and a strap attaching portion 44 are provided on a right side (in the left of FIG. 2) of the camera main body 12.

The power switch 42 is composed of a ring-like wheel 54 as described later. The power switch 42 is rotatively moved between an "OFF position" and an "ON position" and "a macro position". The digital camera 10 is powered off by placing the power switch 42 in the "OFF position". The digital camera 10 is powered on by placing the power switch 42 in the "ON position". Then, by rotating the power switch 42 from the "OFF position" to the "ON position", a movable cylinder 56 holding the photographing lens 24 is extended from the "collapsed position" to the "photographing position" to enable photographing.

Furthermore, the digital camera 10 can be used for macro photographing by placing the power switch 42 in the "macro position". By rotating the power switch 42 from the "ON position" to the "macro position", the movable cylinder 56 holding the photographing lens 24 is extended to the "macro photographing position".

Figure 4:
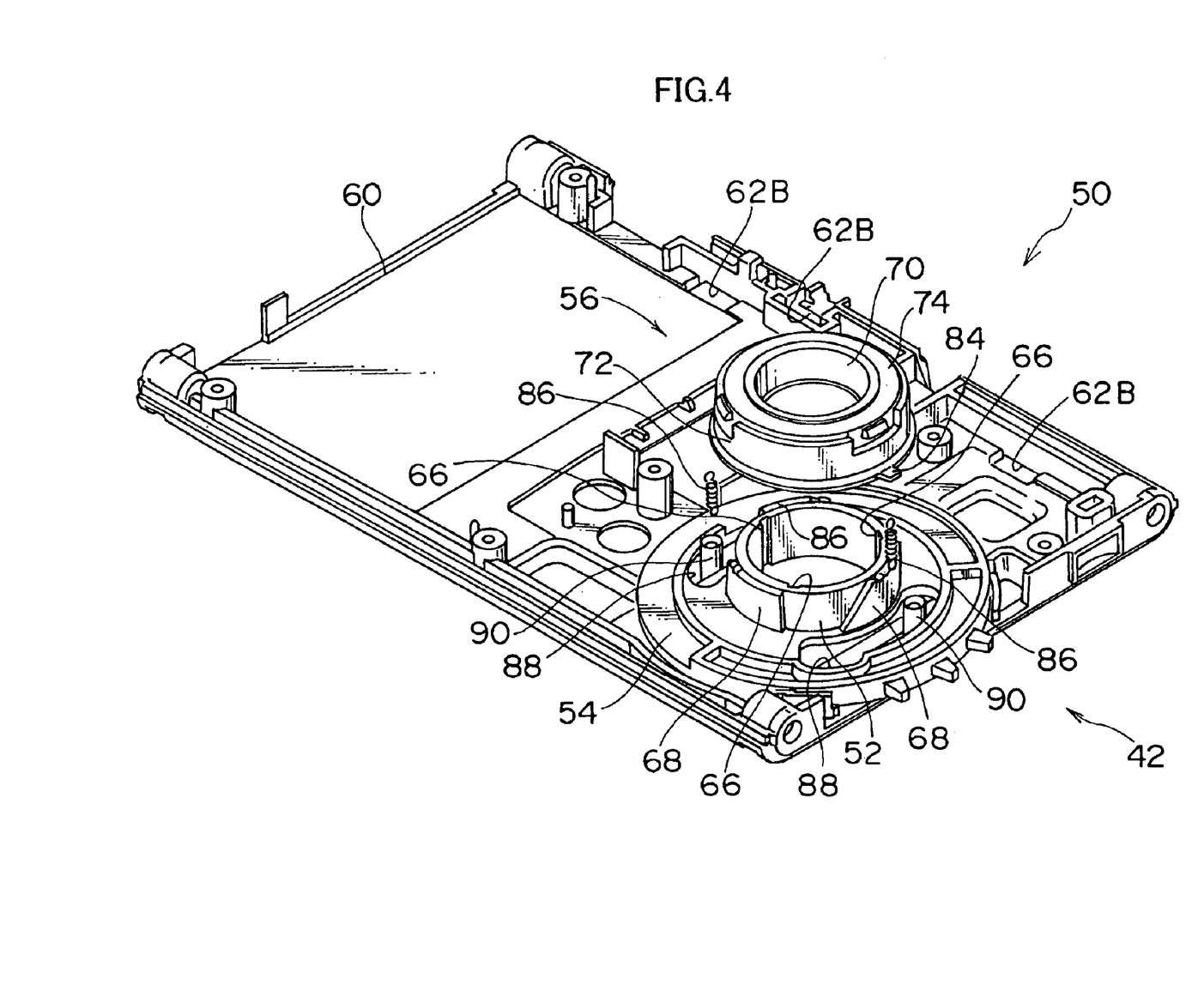
FIG. 4 is an exploded perspective view showing the configuration of a lens barrel of a photographing lens.

FIG. 4 is an exploded perspective view showing the configuration of a lens barrel 50 of the photographing lens 24. As shown in this figure, the lens barrel 50 is mainly composed of a fixed cylinder 52, a wheel 54, and the movable cylinder 56.

Figure 5:
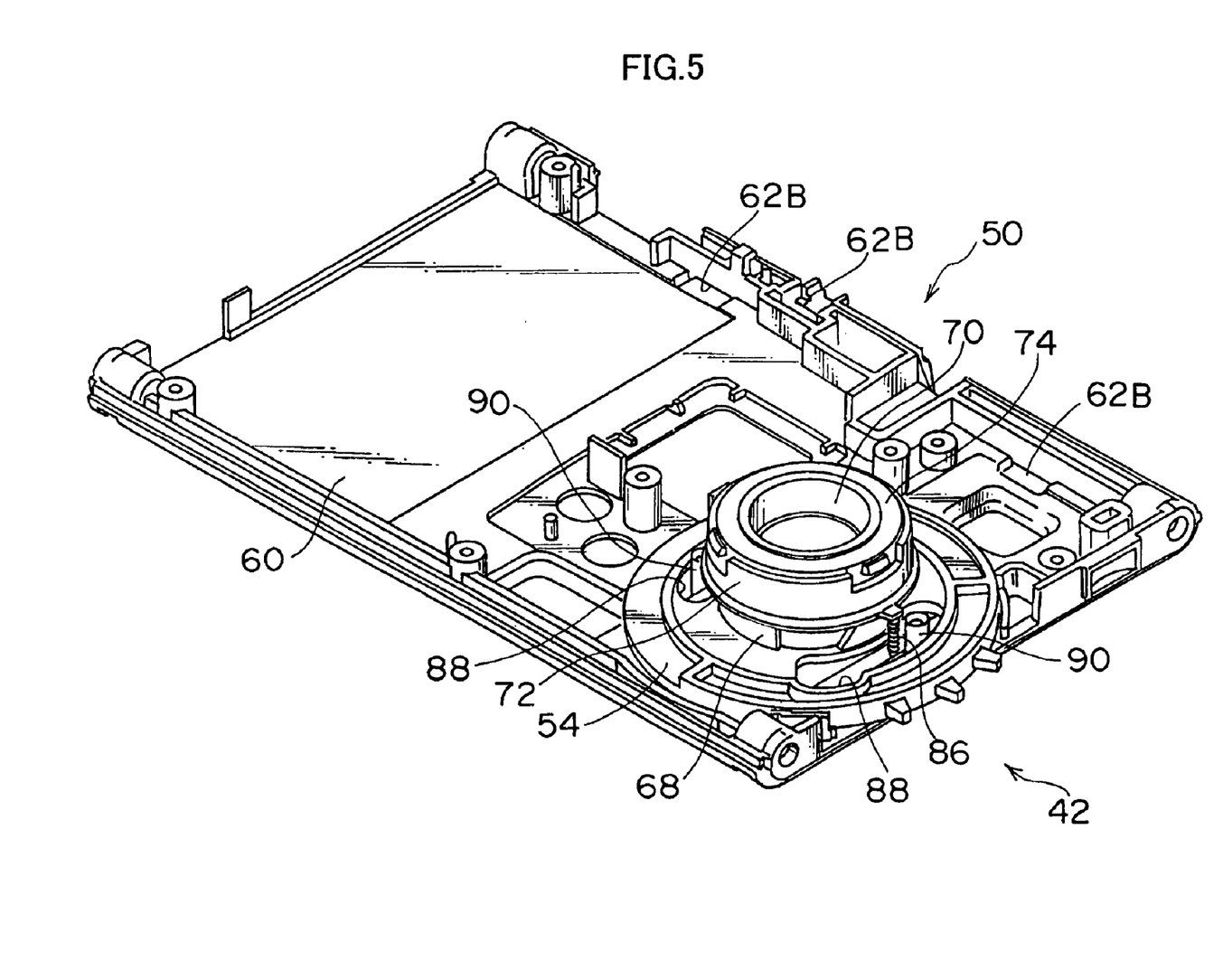
FIG. 5 is a perspective view showing the configuration of a rear frame.
Figure 6:
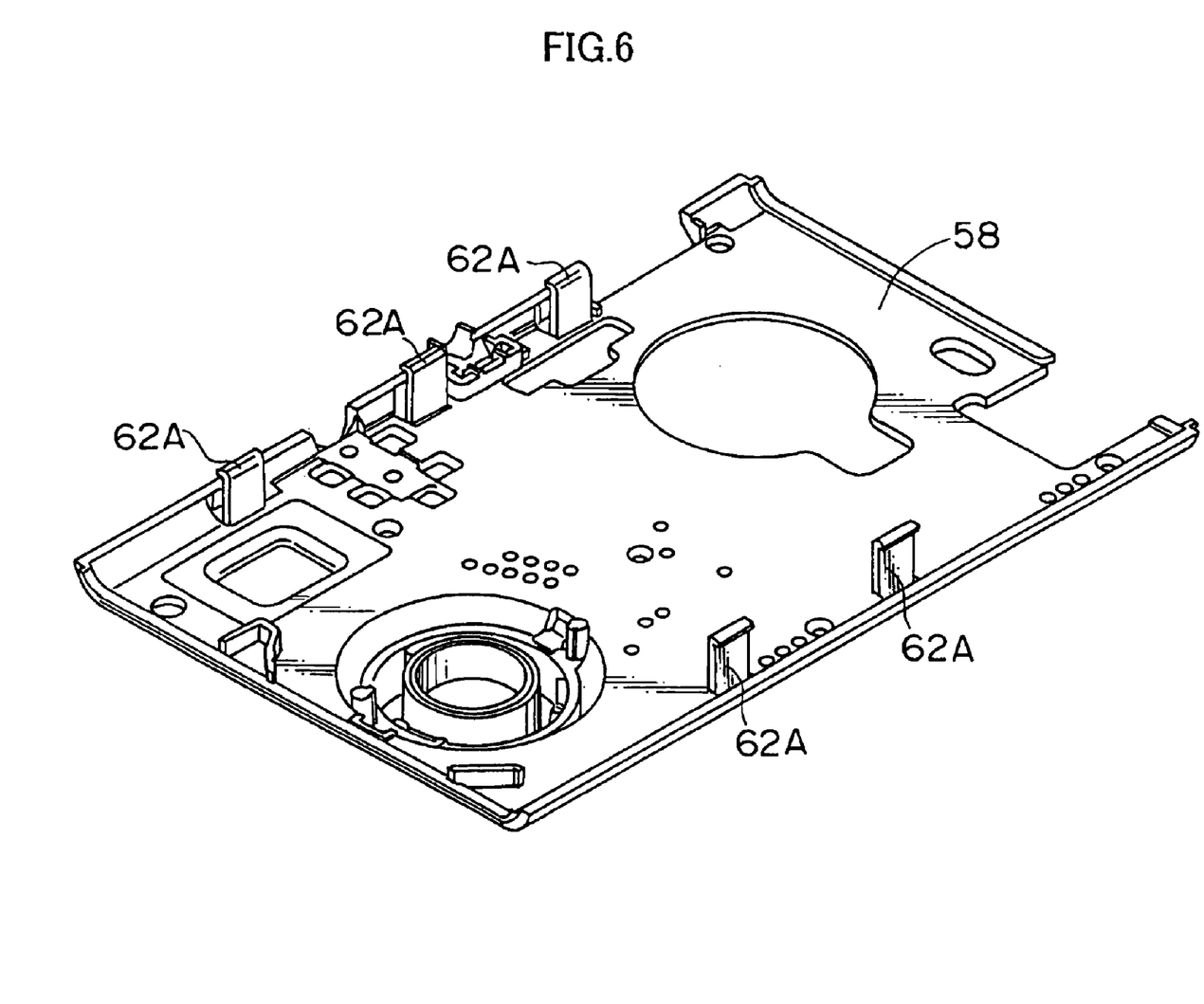
FIG. 6 is a perspective view showing the configuration of a front frame.

The fixed cylinder 52 is integrally provided in the camera main body 12. The camera main body 12 is mainly composed of a front frame 58 and a rear frame 60 as shown in FIGS. 5 and 6. The front frame 58 and the rear frame 60 are both molded of a plastic material in a bright color (for example, a bright gray). The front frame 58 and the rear frame 60 are integrated with each other by fitting engagement pawls 62A formed at three positions on an upper end portion and at two positions on a lower end portion of the front frame 58, into engagement slots 62B formed at the corresponding positions of the rear frame 60 (what is called a snap-in structure). In FIGS. 4 and 5, the engagement slots 62B (two positions) in the lower end portion of the rear frame 60 are omitted.

As shown in FIGS. 1 and 2, decorative plates 58A and 60A made of aluminum are attached to the front frame 58 and rear frame 60, respectively, which are integrated together. Side frames 64R and 64L made of plastics are attached to the respective ends of the front frame 58 and rear frame 60.

As shown in FIG. 4, the fixed cylinder 52 is provided on the rear frame 60, constituting the camera main body 12. The fixed cylinder 52 is molded integrally with the rear frame 60 via a pedestal portion (not shown). The fixed cylinder 52 is formed like a cylinder and has three linearly advancing guide grooves 66 formed in its inner peripheral portion at equal intervals along the optical axis.

The wheel 54 is made of black POM (polyacetal) and formed like ring. The wheel 54 is fitted around an outer peripheral portion of the fixed cylinder 52. The wheel 54 is supported so as to be rotatively movable over a pedestal portion (not shown) provided at a proximal end portion of the fixed cylinder 52. The wheel 54 constitutes the power switch 42 of the camera as described above. It has three end surface cams 68 formed on its inner peripheral portion at equal intervals.

Figure 7:
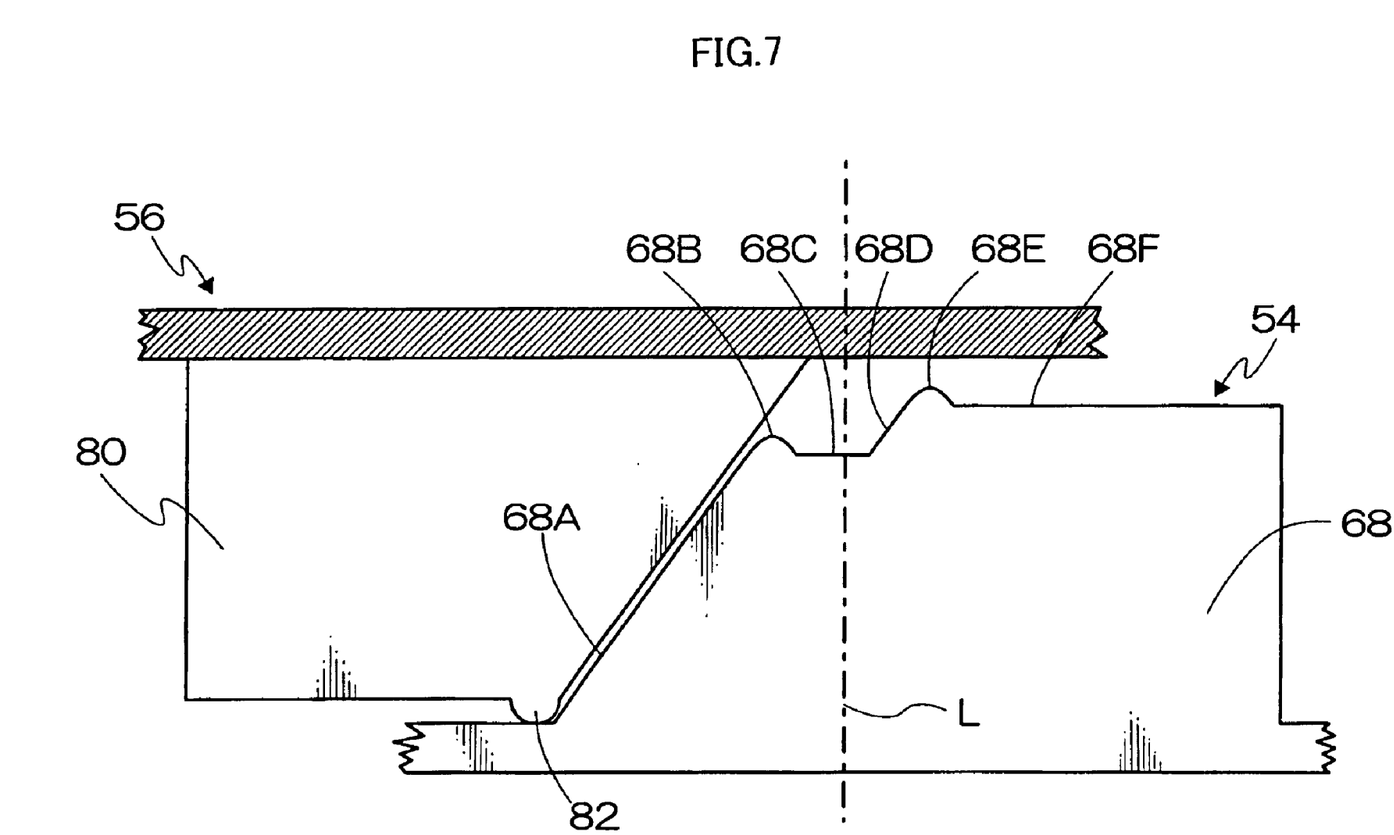
FIG. 7 is a development of an end surface cam.

The end surface cams 68 are formed like arcs along an outer peripheral surface of the fixed cylinder 52. FIG. 7 is a development of the end surface cam 68. As shown in this figure, the end surface cam 68 has a peripheral portion formed like steps; it is mainly composed of a first inclined portion 68A, a first flat portion 68C, a second inclined portion 68D, and a second flat portion 68F.

The first inclined portion 68A and the second inclined portion 68D are formed to be incline from the optical axis L through predetermined angles. The first flat portion 68C and the second flat portion 68F are formed to be orthogonal to the optical axis L.

Furthermore, a first projecting portion 68B is formed in the junction between the first inclined portion 68A and the first flat portion 68C. The first projecting portion 68B projects from the first flat portion 68C as a semispherical projection.

Likewise, a second projecting portion 68E is formed in the junction between the second inclined portion 68D and the second flat portion 68F. The second projecting portion 68E projects from the second flat portion 68F as a semi-spherical projection.

The movable cylinder 56 has a double cylinder structure in which an internal cylinder 70 and an external cylinder 72 are connected together via a leading end cap 74 and integrally formed in a black POM.

Figure 8:
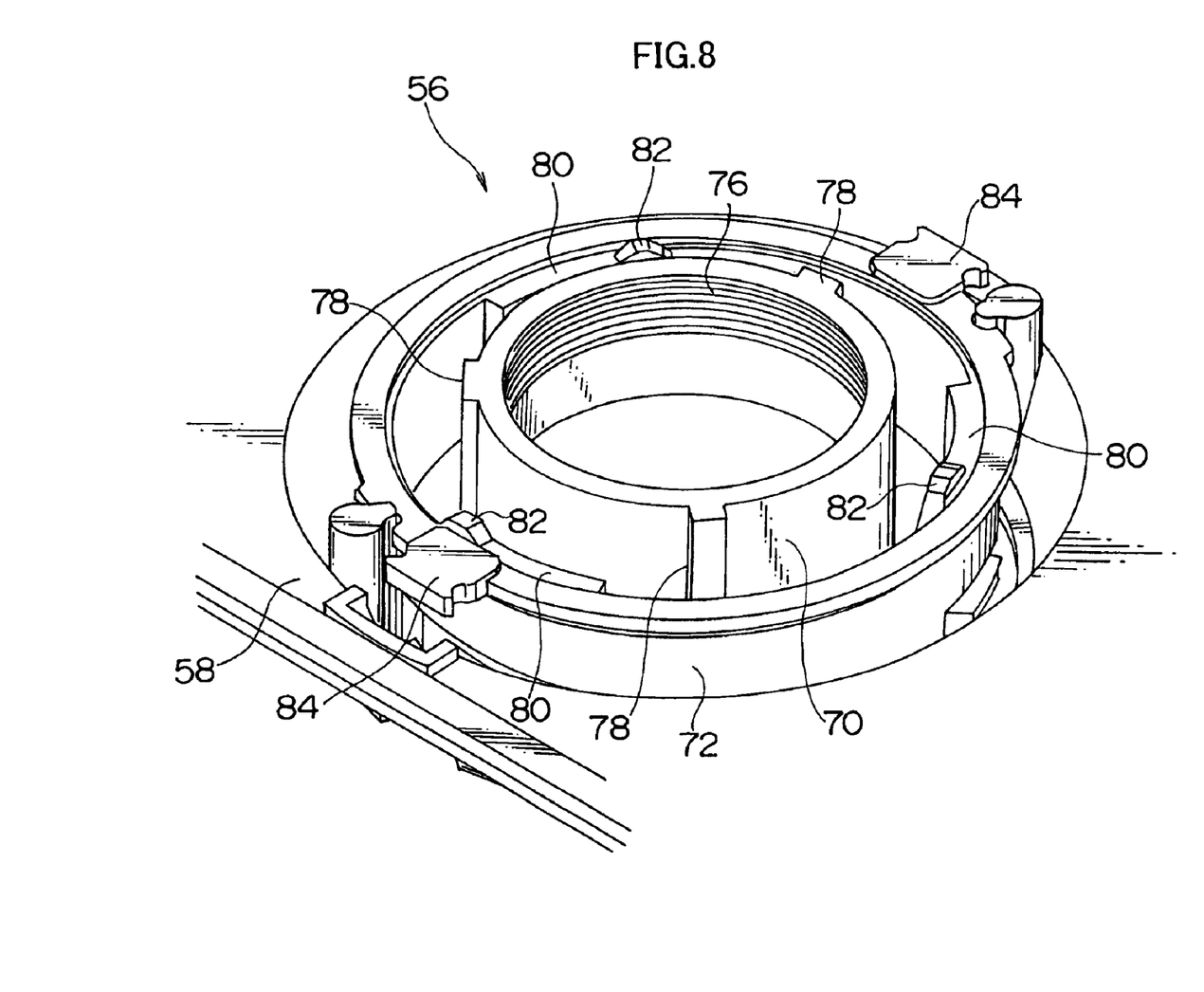
FIG. 8 is a perspective view showing the internal configuration of a movable cylinder.

The internal cylinder 70 is formed like a cylinder and is supported so as to be slidable along the inner peripheral portion of the fixed cylinder 52. The fixed cylinder 70 has the photographing lens 24 held on its inner peripheral portion and has a large number of shielding grooves 76 formed in its inner peripheral portion as shown in FIG. 8. Furthermore, three convex linearly advancing guide portions 78 are formed on an outer peripheral surface of the internal cylinder 70 at equal intervals so as to fit into the three linearly advancing guide grooves 66, formed in the inner peripheral surface of the fixed cylinder 52. The internal cylinder 70 moves linearly along the optical axis as the linearly advancing guide portions 78 slide along the respective linearly advancing guide groove 66.

On the other hand, the external cylinder 72 is formed like a cylinder and concentrically located around an outer peripheral portion of the internal cylinder 70. Three projecting portions 80 are formed on an inner peripheral portion of the external cylinder 72 at equal intervals as shown in FIG. 8. The projecting portions 80 are formed like inverse trapezoids extended from the inner peripheral surface of the external cylinder 72 as shown in FIG. 7. A semicircular cam follower 82 is integrally formed at one end of a lower side of each projecting portion 80. Furthermore, a pair of spring catching portions 84 is formed on the outer periphery of a proximal end portion of the external cylinder 72. A compression spring 86 is caught on each spring catching portion 84 so as to lie between the spring catching portion 84 and the rear frame 60 as described later.

Once the wheel 54 is installed in the fixed cylinder 52, the movable cylinder 56 is installed over the fixed cylinder 52 by fitting the internal cylinder 70 into the inner peripheral portion of the fixed cylinder 52. The cam followers 82 on the projecting portions 80, formed on the inner peripheral portion of the external cylinder 72 of the movable cylinder 56 installed over the fixed cylinder 52, abut the peripheries of the corresponding end surface cams 68, formed on the wheel 54. At this time, each cam follower 82, formed like a semicircle, comes into point contact with the periphery of the corresponding end surface cam 68 for abutment.

One end of each compression spring 86 is caught on the corresponding spring catching portion 84 of the pair, formed on the outer peripheral portion of the proximal end portion of the external cylinder 72 of the movable cylinder 56 installed over the fixed cylinder 52. The other end of the compression spring 86 is caught on a spring catching portion (not shown) integrally formed on the rear frame 60. The movable cylinder 56 is always urged toward the rear frame 60 by the compression springs 86 set between the spring catching portions 84 and the rear frame 60. The movable cylinder 56 is urged toward the rear frame 60 to press and abut the cam followers 82 of the movable cylinder 56 against the peripheries of the corresponding end surface cams 68 of the wheel 54.

A pair of openings 88 formed like arcs are formed in the wheel 54. One end of each compression spring 86 is caught, through the corresponding opening 88, on the corresponding spring catching portion formed on the rear frame 60.

A strut 90 standing perpendicularly from the rear frame 60 is inserted through each opening 88 in the wheel 54. The struts 90 restrict the rotative movement range of the wheel 54. Specifically, when the wheel 54 is rotated in one direction, one end of each opening 88 abuts against the corresponding strut 90 at a predetermined position to stop the rotation. Similarly, when the wheel 54 is rotated in the other direction, the other end of the opening 88 abuts against the strut 90 at a predetermined position to stop the rotation. This serves to support the wheel 54 so that it can be rotatively moved only within a specific range.

When the wheel 54 is rotated, the movable cylinder 56 installed over the fixed cylinder 52 as described above is moved forward or backward along the optical axis through the action of the end surface cams 68 and cam followers 82, provided on the wheel 54. The moving action of the movable cylinder will be described below with reference to FIG. 9.

Figure 9A:
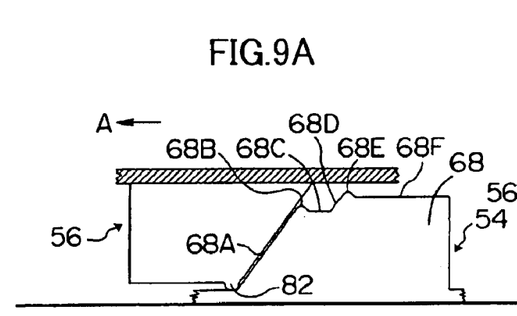
FIGS. 9A to 9G are diagrams illustrating a moving action of the movable cylinder.

FIG. 9A shows the movable cylinder 56 being collapsed. In this state, a leading end portion of the movable 56 is flush with a front surface of the camera main body 12. Furthermore, in this state, each of the cam followers 82 of the movable cylinder 56 abuts against a lower end portion of the first inclined portion 68A of the corresponding one of the end surface cams 68, provided on the wheel 54.

Figure 9B:
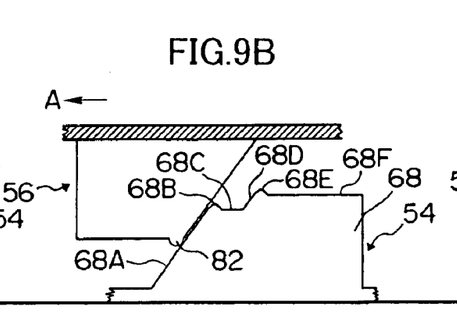

When the movable cylinder 56 located in the collapsed position rotates the wheel 54 in a direction shown by arrow A, the cam follower 82 is pushed by the first inclined surface 68A of the end surface cam 68 to extend the movable cylinder 56 along the optical axis, as shown in FIG. 9B.

Figure 9C:
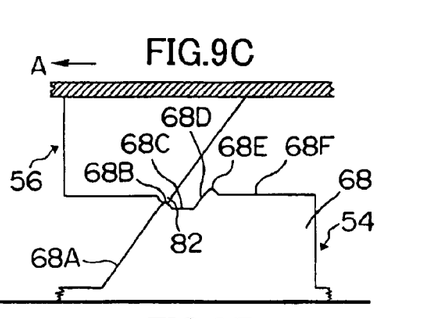
Figure 9D:
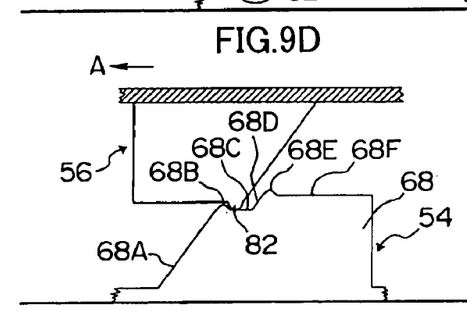

The wheel 54 continues to be rotated. Then, as shown in FIG. 9C, once the wheel 54 is placed in a predetermined rotational angle position, the cam follower 82 reaches the first projecting portion 68B. Then, when the wheel 54 is further rotated, the cam follower 82 climbs over the first projecting portion 68B to reach the first flat portion 68C as shown in FIG. 9D. Once the cam follower 82 reaches the first flat portion 68C, the movable cylinder 56 is placed in the photographing position. Then, in this position, when the rotation of the wheel 54 is stopped, the movable cylinder 56 is held in the photographing position.

Figure 9E:
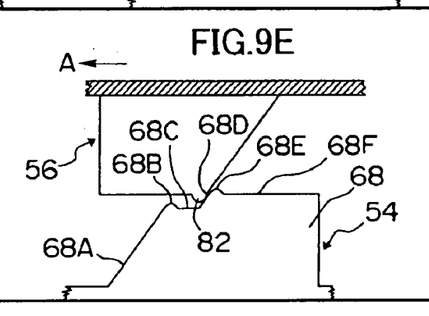
Figure 9F:
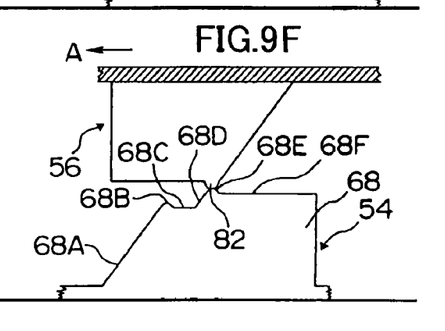
Figure 9G:
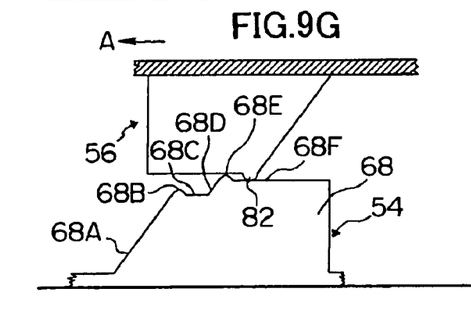

After the movable cylinder 56 has been placed in the photographing position, the wheel 54 is rotated in the direction of arrow A. Then, when the wheel 54 is placed in a predetermined rotational angle position, the cam follower 82 abuts against a lower end portion of the second inclined portion 68D of the end surface cam 68. Then, when the wheel 54 is further rotated, the cam follower 82 is pushed by the second inclined surface 68D to extend the movable cylinder 56 along the optical axis, as shown in FIG. 9E. The wheel 54 continues to be further rotated. Then, as shown in FIG. 9F, once the wheel 54 is placed in a predetermined rotational angle position, the cam follower 82 reaches the second projecting portion 68E. Then, when the wheel 54 is further rotated, the cam follower 82 climbs over the second projecting portion 68E to reach the second flat portion 68F as shown in FIG. 9G. Once the cam follower 82 reaches the second flat portion 68F, the movable cylinder 56 is placed in the macro photographing position. Then, in this position, when the rotation of the wheel 54 is stopped, the movable cylinder 56 is held in the macro photographing position.

In this manner, when the wheel 54 is rotated, the movable cylinder 56 is extended from the "collapsed position" through the "photographing position" to the "macro photographing position" along the optical axis through the action of the end surface cams 68 and cam followers 82, provided on the wheel 54. Then, the movable cylinder 56 extended to the "macro photographing position" is withdrawn through the "photographing position" to the "collapsed position" by the reverse operation.

In this case, the wheel 54, which moves the movable cylinder 56 forward or backward, is partly exposed from the right side of the camera main body 12 as a power switch 42, as shown in FIG. 2.

Figure 10:
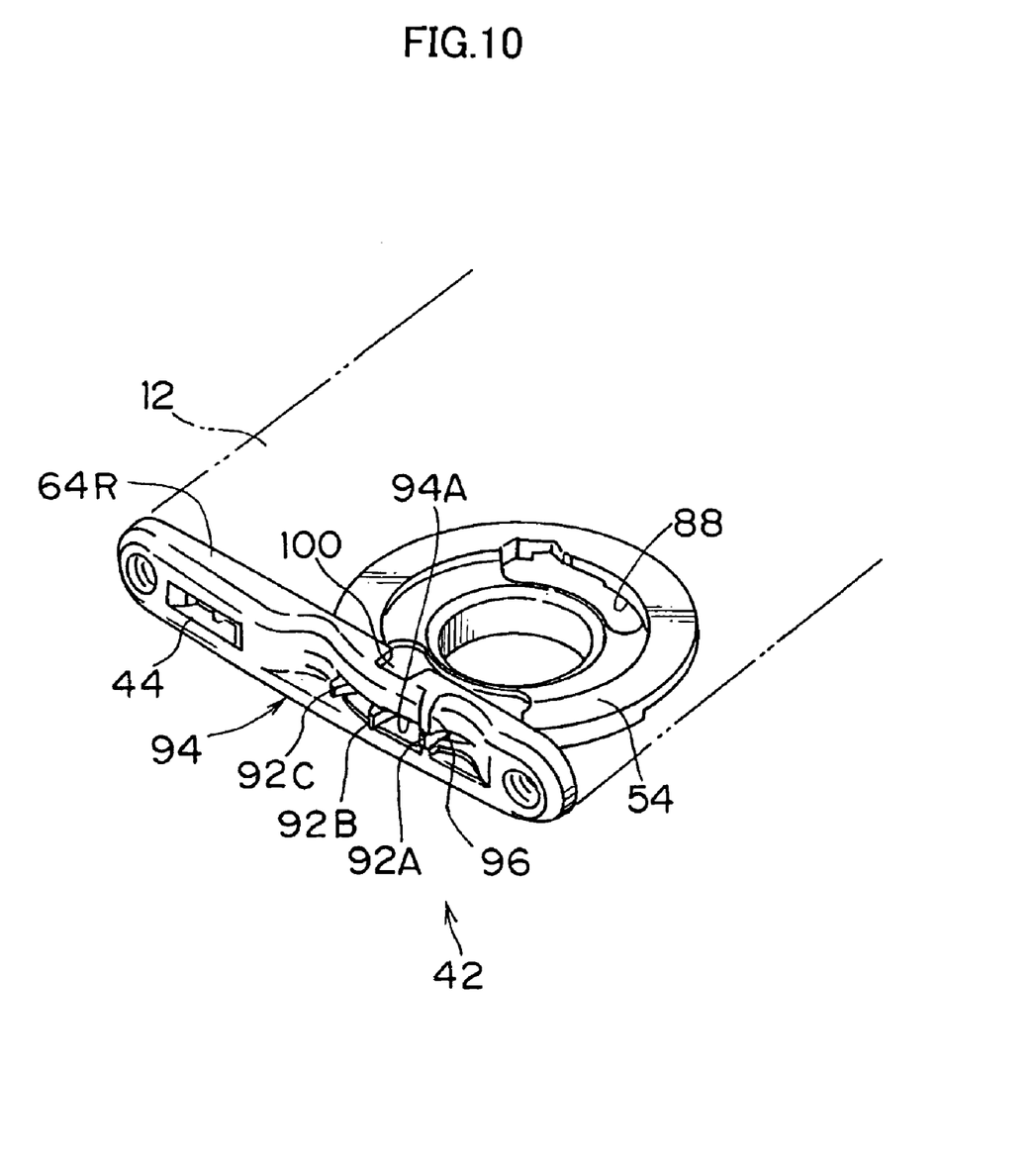
FIG. 10 is a perspective view showing the configuration of a power switch.
Figure 11:
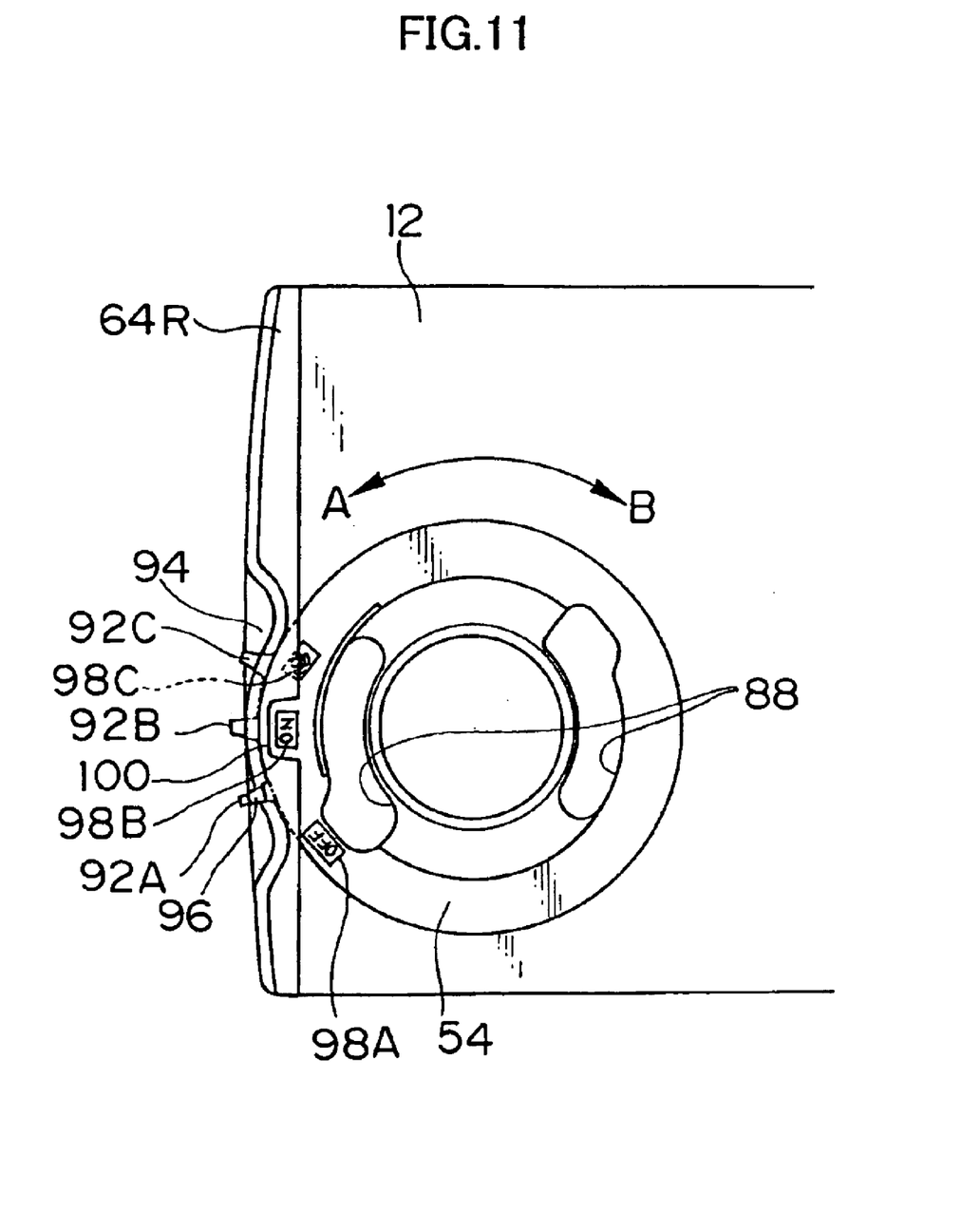
FIG. 11 is a plan view showing the configuration of the power switch.

FIGS. 10 and 11 are an enlarged perspective and plan views showing the part of the power switch 42.

As shown in these figures, three pawls 92A, 92B, and 92C are disposed on the outer periphery of the wheel 54 at predetermined intervals.

On the other hand, in the side frame 64R, constituting the camera main body 12, an arc guide portion 94 is formed on along the outer peripheral shape of the wheel 54. A slit 94A is formed in the guide portion 94. The pawls 92A, 92B, and 92C, formed on the wheel 54, are arranged so as to project through the slit 94A. Moreover, a stopper 96 is projectively formed on the guide portion 94 at its predetermined position. The stopper 96 is formed parallel with a shaft of the wheel 54. When the nails of the fingers are placed on the pawls 92A and 92B to rotate the wheel 54, the nails of the fibers abut against the stopper 96. Consequently, the pawls 92A and 92B can be stopped at the position of the stopper 96.

Now, the movable cylinder 56 is assumed to lie in the collapsed position. At this time, the wheel 54 is in the "OFF position". Of the three pawls 92A, 92B, and 92C, only the first pawl 92A projects through the slit 94A in the guide portion 94.

In this state, the nail of the finger is placed on the first pawl 92A to rotate the wheel 54 in a direction A in FIG. 11. Then, once the wheel 54 is rotated by a predetermined amount, the nail of the finger is caught on the stopper 96 to stop the rotation of the wheel 54. At this time, the wheel 54 is placed in the "ON position", with the first pawl 92A placed at the same position as that of the stopper 96. Then, when the wheel 54 is rotated to the "ON position", the rotating action of the wheel 54 extends the movable cylinder 56 to the "photographing position". Specifically, when the wheel 54 is rotated from the "OFF position" to the "ON position", each of the end surface cams 68, formed on the wheel 54, moves from the proximal end portion of the first inclined surface 68A to the first flat surface 68C relative to the corresponding cam follower 82. As a result, the movable cylinder 56 is extended to the "photographing position". When the wheel 54 is rotated from the "OFF position" to the "ON position", electric contacts (not shown) are closed to power on the camera.

While the wheel 54 is being rotated from the "OFF position" to the "ON position", each of the cam followers 82, provided on the movable cylinder 56, passes over the first projecting portion 68B, formed on the corresponding one of the end surface cams 68 of the wheel 54. When the cam follower 82 passes over the first projecting portion 68B, a shock is transmitted to the nail. The shock is felt as a click to allow the user to confirm that the wheel 54 has been placed in the "ON position".

Once the wheel 54 is placed in the "ON position" and the movable cylinder 56 is extended to the photographing position, the three pawls 92A, 92B, and 92C project through the slit 94A in the guide portion 94. In this state, when the user places his or her finger nail on the second pawl 92B to rotate the wheel 54 in the direction A in FIG. 11. Then, once the wheel 54 is rotated by a predetermined amount, the finger nail is caught on the stopper 96 to stop the rotation of the wheel 54. At this time, the wheel 54 is placed in the "macro position", with the second pawl 92B placed at the same position as that of the stopper 96. Then, when the wheel 54 is rotated to the "macro position", the rotating action of the wheel 54 extends the movable cylinder 56 to the "macro shooting position". Specifically, when the wheel 54 is rotated from the "ON position" to the "macro position", each of the end surface cams 68, formed on the wheel 54, moves from the first flat surface 68C to the second flat surface 68F relative to the corresponding cam follower 82. As a result, the movable cylinder 56 is extended to the "macro photographing position".

While the wheel 54 is being rotated from the "ON position" to the "macro position", each of the cam followers 82, provided on the movable cylinder 56, passes over the second projecting portion 68E, formed on the corresponding one of the end surface cams 68 of the wheel 54. When the cam follower 82 passes over the second projecting portion 68E, a shock is transmitted to the nail. The shock is felt as a click to allow the user to confirm that the wheel 54 has been placed in the "macro position".

With the wheel 54 in the "ON position", when the user places his or her finger nail on the second pawl 92B to rotate the wheel 54 in a direction B in FIG. 11, each of the cam followers 82, formed on the movable cylinder 56, passes over the first projecting portion 68B. Then, when the cam follower 82 passes over the first projecting portion 68B, the urging force of the compression spring 86 withdraws the movable cylinder 56. Thus, the wheel 54 is placed in the "OFF position" to collapse the movable cylinder 56 into the "collapsed position". The wheel 54 is placed in the "OFF position" to open the electric contacts (not shown). Thus, the camera is powered off.

Likewise, with the wheel 54 in the "macro position", when the user places his or her finger nail on the third pawl 92C to rotate the wheel 54 in the direction B in FIG. 11, each of the cam followers 82, formed on the movable cylinder 56, passes over the second projecting portion 68B. Then, when the cam follower 82 passes over the second projecting portion 68E, the urging force of the compression spring 86 withdraws the movable cylinder 56. Thus, the wheel 54 is placed in the "ON position" to contract the movable cylinder 56 into the "photographing position".

In this manner, the wheel 54 can be rotatively moved between the "OFF position" and the "ON position" and the "macro position" by placing the finger nail on the three pawls 34A, 34B, and 34C, formed on the outer peripheral portion of the wheel 54 to rotate the wheel. Then, when the wheel is placed in the "OFF position", the movable cylinder 56 holding the photographing lens 24 is collapsed into the "collapsed position". When the wheel 54 is placed in the "ON position", the movable cylinder 56 is extended to the "photographing position". When the wheel 54 is placed in the "macro position", the movable cylinder 56 is extended to the "macro photographing position".

Furthermore, when the wheel 54 is in the "OFF position", an icon 98A of an "OFF" mark on the rear surface of the wheel 54 is located under a window 100 formed in the side frame 64R. The user can check the display in the window 100 to confirm that the camera is now in an OFF state.

Similarly, when the wheel 54 is in the "ON position", an icon 98B of an "ON" mark on the rear surface of the wheel 54 is located under the window 100. When the wheel 54 is in the "macro position", an icon 98C of a "macro" mark (a tulip mark) on the rear surface of the wheel 54 is located under the window 100. The user can check the display in the window 100 to confirm that the camera is now in an ON state or in a macro photographing state.

As described above, the rotative movement of the wheel 54 is regulated by the strut 90. The range of the rotative movement is limited to the extent that the wheel 54 can rotatively move between the "OFF position" and the "macro position". This prevents the wheel 54 from rotating beyond the "OFF position" or "macro position".

The digital camera 10 configured as previously described operates as described below.

When the wheel 54, constituting the power switch 42, is placed in the "OFF position", the digital camera 10 is powered off. In this state, the movable cylinder 56 holding the photographing lens 24 is placed in the "collapsed position". Of the three pawls 92A, 92B, and 92C, formed on the wheel 54, the first pawl 92A projects through the guide portion 94, formed on the right side of the camera main body 12.

With the wheel 54 in the "OFF position", when the finger nail is placed on the first pawl 92A, projecting through the guide portion 94, to rotate the wheel 54, the stopper 96, formed on the guide portion 94, acts to stop and place the rotating wheel 54 in the "ON position". Once the wheel 54 is placed in the "ON position", the movable cylinder 56 is extended to the "photographing position". At the same time, the camera is powered on. This enables normal photographing.

Furthermore, with the wheel 54 in the "ON position", when the finger nail is placed on the second pawl 92B, projecting through the guide portion 94, to rotate the wheel 54, the stopper 96, formed on the guide portion 94, acts to stop and place the rotating wheel 54 in the "macro position". Once the wheel 54 is placed in the "macro position", the movable cylinder 56 is extended to the "macro position" to enables macro photographing.

On the other hand, with the wheel 54 in the "ON position", when the finger nail is placed on the second pawl 92B, projecting through the guide portion 94, to rotate the wheel 54 in the opposite direction, the compression springs 86 act to withdraw the movable cylinder 56 to the "collapsed position". At the same time, the camera is powered off.

Likewise, with the wheel 54 in the "macro position", when the finger nail is placed on the third pawl 92C, projecting through the guide portion 94, to rotate the wheel 54 in the opposite direction, the compression springs 86 act to withdraw the movable cylinder 56 to the "photographing position" to return to normal photographing.

As described above, according to the digital camera 10 of the present embodiment, the rotating operation of the wheel 54 enables the movable cylinder 56 holding the photographing lens 24 between the "collapsed position" and the "photographing position" and the "macro photographing position".

In this case, by guiding the movement of the movable cylinder 56 using the three cam followers 82, which slide along the peripheries of the respective end surface cams 68, provided on the wheel 54, it is possible to precisely extend the movable cylinder 56 holding the photographing lens 24 to the "photographing position" and to the "macro photographing position" using the simple configuration.

Furthermore, the three cam followers 82 are formed semicircularly and come into point contact with the peripheries of the respective end surface cams 68. This reduces frictional resistance to allow the movable cylinder 56 to be smoothly extended.

Moreover, the movable cylinder 56 including the three cam followers 82 and the wheel 54 are molded of POM. This further reduces the frictional resistance, while increasing rigidity. Furthermore, by molding the movable cylinder 56 and the wheel 54 using black POM, it is possible to prevent the entry of extraneous light into the barrel or its reflection from the inner surface of the barrel. Therefore, sharp images can be photographed.

Furthermore, the first projecting portion 68B and the second projecting portion 68E are formed on each end surface cam 68, which guides the corresponding cam follower 82. Accordingly, the movement of the cam follower 82 can be regulated when it is located at the first flat portion 68C and the second flat portion 68F. Furthermore, the user can feel a click upon rotating the wheel 54. This makes it possible to prevent the movable cylinder 56 extended to the "photographing position" or "macro photographing position" from being easily moved. The user's finger can also feel the extension of the movable cylinder 56 to the "photographing position" or "macro photographing position".

In the present embodiment, the three linearly advancing guide portions formed on the movable cylinder 56 are fitted into the respective linearly advancing guide grooves formed in the fixed cylinder 52 to guide the movable cylinder 56 along the optical axis. However, linearly advancing guide grooves may be formed in the movable cylinder 56, while convex portions or pin-like linearly advancing guide portions which are engaged in the advancing guide may be formed on the fixed cylinder 52.

Furthermore, in the present embodiment, the cam followers are semicircular. However, the present invention is not limited to this shape provided that each cam follower can come into point contact with the peripheral surface of the corresponding end surface cam.

Moreover, in the description of the example in the present embodiment, the collapsible lens barrel according to the present invention is applied to the digital camera. However, the application of the present invention is not limited to this aspect. The present invention is also applicable to a silver camera. In particular, the present invention is effective on a recycled silver camera.

What is claimed is:

1. A collapsible lens barrel comprising:
    a fixed cylinder fixed to a camera main body;
    a wheel rotatively movably provided around an outer periphery of a proximal end portion of said fixed cylinder;
    a plurality of end surface cams disposed on an inner peripheral portion of the wheel at predetermined intervals;
    a movable cylinder which holds a photographing lens, which is guided so as to be movable in a direction of an optical axis with respect to said fixed cylinder, and which has a plurality of cam followers abutting against said plurality of end surface cams; and
    an urging device which urges the cam followers of said movable cylinder to said end surface cams,
    wherein said wheel is rotated to extend said movable cylinder from a collapsed position to a photographing position.

2. The collapsible lens barrel according to claim 1, wherein each of the end surface cams comprises:
    a first inclined portion inclined from the optical axis through a predetermined angle;
    a first flat portion formed contiguously to the first inclined portion so as to extend orthogonally to the optical axis;
    a second inclined portion formed contiguously to the first flat portion and inclined from the optical axis through a predetermined angle; and
    a second flat portion formed contiguously to the second inclined portion so as to extend orthogonally to the optical axis,
    wherein when said wheel is rotated, said movable cylinder is extended from the collapsed position to a first photographing position through action of said first inclined portion and first flat portion, and when said wheel is further rotated, said movable cylinder is extended from said first photographing position to a second photographing position through action of said second inclined portion and second flat portion.

3. The collapsible lens barrel according to claim 2, wherein each of said end surface cams comprises:
    a first projecting portion formed in a junction between said first inclined portion and said first flat portion so as to project from said first flat portion; and
    a second projecting portion formed in a junction between said second inclined portion and said second flat portion so as to project from said second flat portion.

4. The collapsible lens barrel according to claim 1, wherein said movable cylinder comprises:
    an internal cylinder having said photographing lens held on its inner peripheral portion; and
    an external cylinder which is connected to the internal cylinder at their leading end portions and which has said cam followers formed on an inner peripheral portion of the external cylinder,
    wherein said internal cylinder is fitted into an inner peripheral portion of said fixed cylinder, and linearly advanced guide portions formed on an outer peripheral surface of said internal cylinder are fitted onto or into convex or concave linearly advancing guide portions formed on the inner peripheral surface of said fixed cylinder along the optical axis so that said movable cylinder is guided so as to be movable in the direction of the optical axis with respect to said fixed cylinder.

5. The collapsible lens barrel according to claim 2, wherein said movable cylinder comprises:
    an internal cylinder having said photographing lens held on its inner peripheral portion; and
    an external cylinder which is connected to the internal cylinder at their leading end portions and which has said cam followers formed on an inner peripheral portion of the external cylinder,
    wherein said internal cylinder is fitted into an inner peripheral portion of said fixed cylinder, and linearly advanced guide portions formed on an outer peripheral surface of said internal cylinder are fitted onto or into convex or concave linearly advancing guide portions formed on the inner peripheral surface of said fixed cylinder along the optical axis so that said movable cylinder is guided so as to be movable in the direction of the optical axis with respect to said fixed cylinder.

6. The collapsible lens barrel according to claim 3, wherein said movable cylinder comprises:

an internal cylinder having said photographing lens held on its inner peripheral portion; and an external cylinder which is connected to the internal cylinder at their leading end portions and which has said cam followers formed on an inner peripheral portion of the external cylinder, wherein said internal cylinder is fitted into an inner peripheral portion of said fixed cylinder, and linearly advanced guide portions formed on an outer peripheral surface of said internal cylinder are fitted onto or into convex or concave linearly advancing guide portions formed on the inner peripheral surface of said fixed cylinder along the optical axis so that said movable cylinder is guided so as to be movable in the direction of the optical axis with respect to said fixed cylinder.

7. The collapsible lens barrel according to claim 1, wherein said cam followers come into point contact with said corresponding end surface cams.

8. The collapsible lens barrel according to claim 2, wherein said cam followers come into point contact with said corresponding end surface cams.

9. The collapsible lens barrel according to claim 3, wherein said cam followers come into point contact with said corresponding end surface cams.

10. The collapsible lens barrel according to claim 4, wherein said cam followers come into point contact with said corresponding end surface cams.

11. The collapsible lens barrel according to claim 5, wherein said cam followers come into point contact with said corresponding end surface cams.

12. The collapsible lens barrel according to claim 6, wherein said cam followers come into point contact with said corresponding end surface cams.

13. The collapsible lens barrel according to claim 1, wherein said movable cylinder is formed of a plastic material in a dark color.

14. The collapsible lens barrel according to claim 2, wherein said movable cylinder is formed of a plastic material in a dark color.

15. The collapsible lens barrel according to claim 3, wherein said movable cylinder is formed of a plastic material in a dark color.

16. The collapsible lens barrel according to claim 4, wherein said movable cylinder is formed of a plastic material in a dark color.

17. The collapsible lens barrel according to claim 5, wherein said movable cylinder is formed of a plastic material in a dark color.

18. The collapsible lens barrel according to claim 6, wherein said movable cylinder is formed of a plastic material in a dark color.

* * * * *